United States Patent [19]

Kashio

[11] Patent Number: 5,202,984
[45] Date of Patent: Apr. 13, 1993

[54] APPARATUS AND METHOD FOR UPDATING TRANSACTION FILE

[75] Inventor: Toshio Kashio, Tokyo, Japan

[73] Assignee: Casio Computer Co., Ltd., Tokyo, Japan

[21] Appl. No.: 851,233

[22] Filed: Mar. 13, 1992

Related U.S. Application Data

[63] Continuation of Ser. No. 360,021, Jun. 1, 1989.

[30] Foreign Application Priority Data

| Jul. 14, 1988 | [JP] | Japan | 63-175404 |
| Jul. 14, 1988 | [JP] | Japan | 63-175405 |
| Jul. 14, 1988 | [JP] | Japan | 63-175406 |

[51] Int. Cl.⁵ .......... G06F 7/10; G06F 15/18
[52] U.S. Cl. .......... 395/600; 364/401; 364/406; 364/DIG. 1; 364/222.82; 364/225.1
[58] Field of Search .......... 355/600, 700; 364/DIG. 1, DIG. 2, 401, 406, 408

[56] References Cited

U.S. PATENT DOCUMENTS

| 3,822,378 | 7/1974 | Kashio | 235/176 |
| 4,003,031 | 1/1977 | Kashio | 340/172.5 |
| 4,031,515 | 6/1977 | Kashio | 364/200 |
| 4,032,900 | 6/1977 | Kashio | 364/200 |
| 4,034,350 | 7/1977 | Kashio | 364/900 |
| 4,064,553 | 12/1977 | Kashio | 364/200 |
| 4,079,234 | 3/1978 | Kashio | 235/92 |
| 4,103,334 | 7/1978 | Kashio | 364/900 |
| 4,133,041 | 1/1979 | Kashio | 364/900 |
| 4,145,753 | 3/1979 | Kashio | 364/900 |
| 4,321,672 | 3/1982 | Braun | 364/900 |
| 4,370,707 | 1/1983 | Phillips et al. | 395/600 |
| 4,555,759 | 12/1985 | McCaskill et al. | 395/600 |
| 4,633,397 | 12/1986 | Macco | 364/401 |
| 4,642,767 | 2/1987 | Lerner | 364/406 |
| 4,667,292 | 5/1987 | Mohlenbrock et al. | 364/200 |
| 4,730,252 | 3/1988 | Bradshaw | 395/600 |
| 4,809,170 | 2/1989 | Leblang et al. | 364/200 |
| 4,851,999 | 7/1989 | Moriyama | 364/401 |
| 4,914,569 | 4/1990 | Levine et al. | 364/200 |
| 4,939,689 | 7/1990 | Davis et al. | 364/900 |
| 4,949,258 | 8/1990 | Miyamoto | 364/405 |
| 4,967,348 | 10/1990 | Naito et al. | 364/200 |

FOREIGN PATENT DOCUMENTS

| 53-46689 | 12/1978 | Japan |
| 57-51137 | 10/1982 | Japan |
| 57-56093 | 11/1982 | Japan |
| 58-46735 | 10/1983 | Japan |
| 58-53384 | 11/1983 | Japan |

OTHER PUBLICATIONS

Ralston et al, Encyclopedia of Computer Science and Eng. 1983, pp. 2-6, 441-447.

*Primary Examiner*—David L. Clark
*Assistant Examiner*—John C. Loomis
*Attorney, Agent, or Firm*—Frishauf, Holtz, Goodman & Woodward

[57] ABSTRACT

A table memory is provided for selecting types of files to be updated in accordance with identification codes designating types of transactions. When a transaction occurs, the corresponding transaction record and the identification code indicating the type of transaction are generated. Data from the table memory is retrieved in accordance with the identification code to select all the files to be updated. The selected files are sequentially updated in accordance with the transaction record.

3 Claims, 21 Drawing Sheets

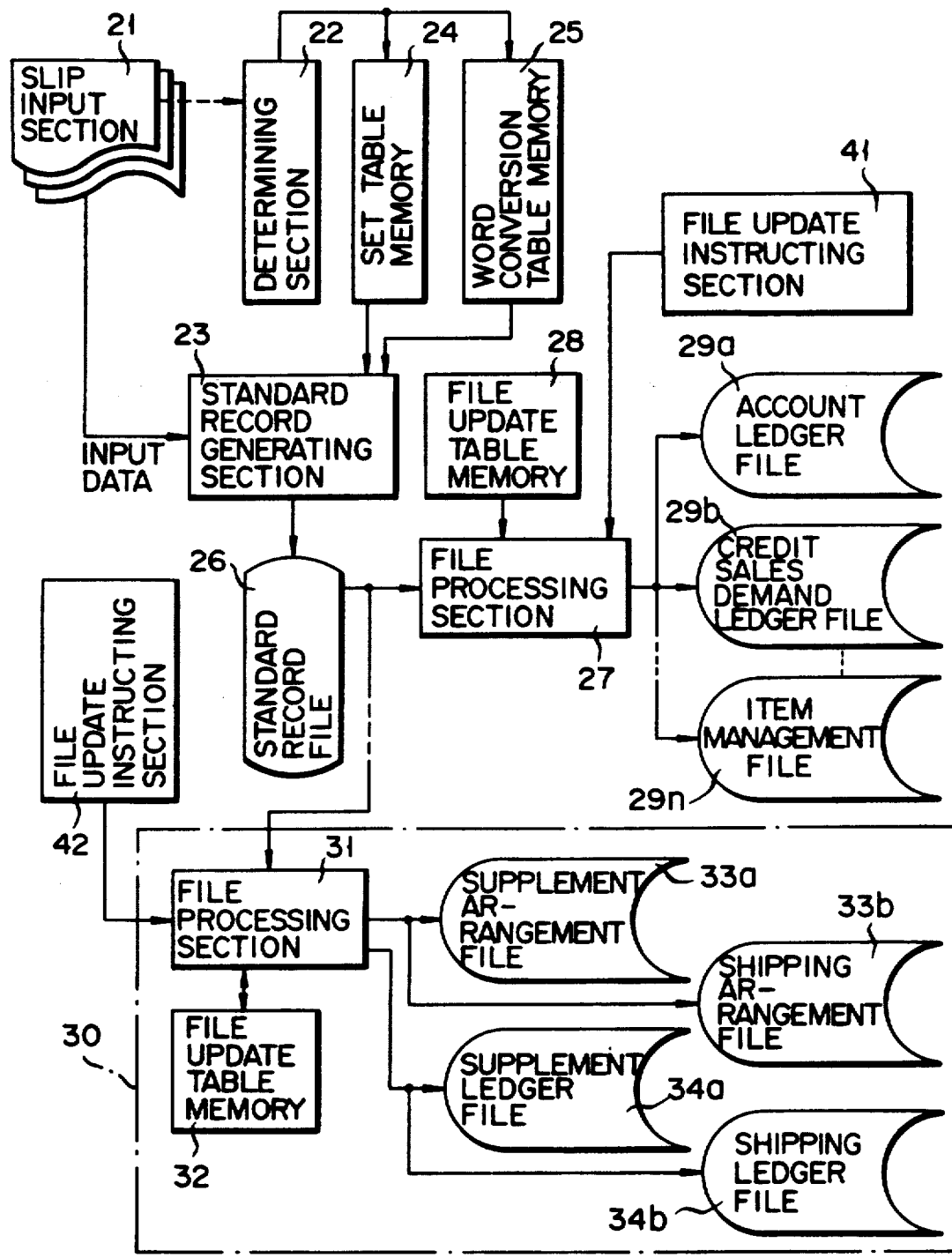
F I G. 1

| DATE |
|---|
| DEBTOR ACCOUNT |
| DEBTOR CLIENT |
| CREDITOR ACCOUNT |
| CREDITOR CLIENT |
| 1ST ID |
| 2ND ID |
| 3RD ID |
| AMOUNT |
| QUANTITY |
| ITEM |
| UNIT PRICE |

FIG. 2

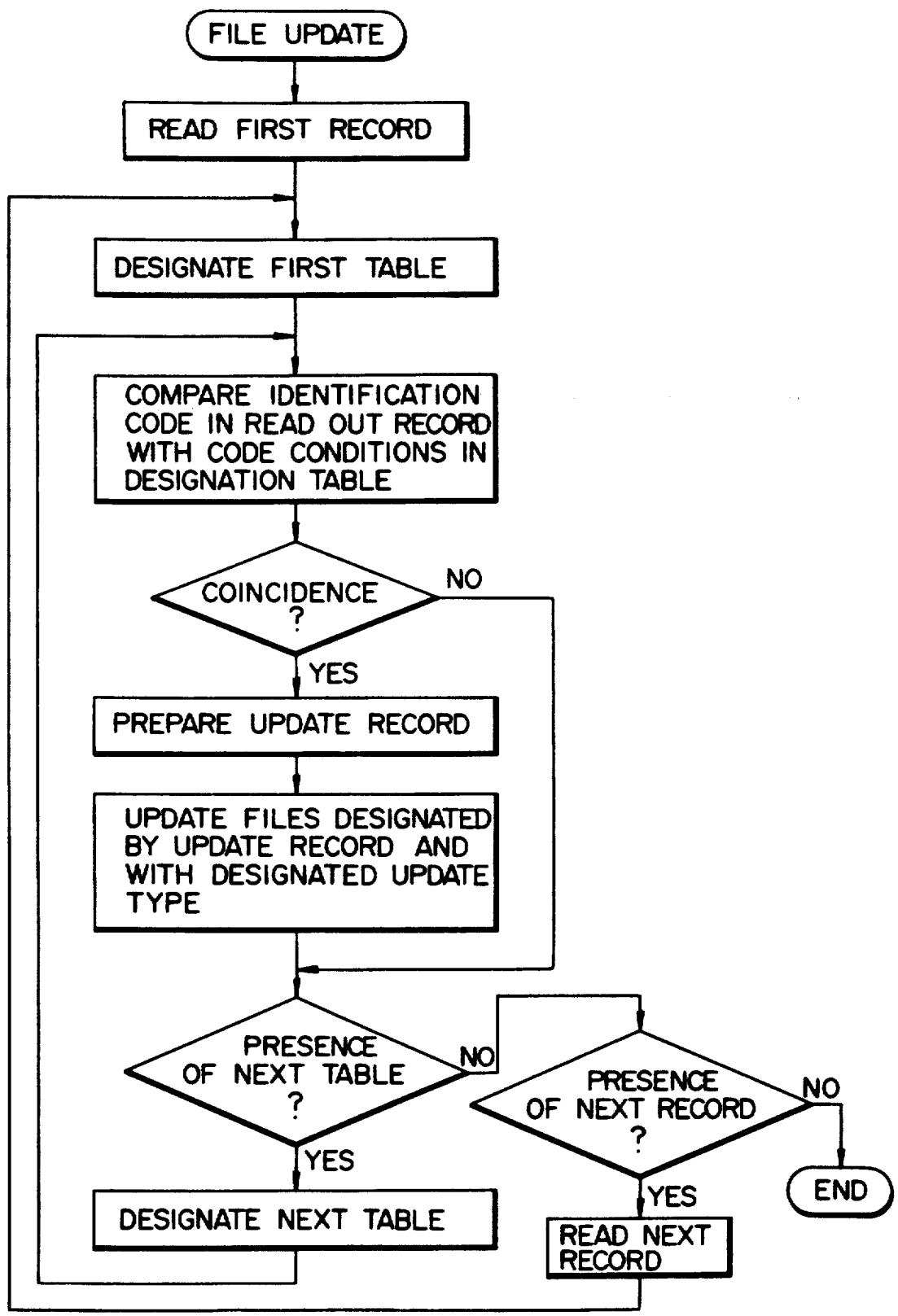
F I G. 3

| STANDARD WORD LABEL \ TYPE OF TRANSACTION | ACCEPTANCE OF ORDER | SALES | SALES RETURNS | ISSUANCE OF ORDER | PURCHASE |
|---|---|---|---|---|---|
| DEBTOR ACCOUNT | [CREDIT SALES] | [CREDIT SALES] | [SALES] | [PURCHASE] | [PURCHASE] |
| CREDITOR ACCOUNT | [SALES] | [SALES] | [CREDIT SALES] | [DEBT SALES] | [DEBT SALES] |
| 1ST ID | [10] | [10] | [10] | [20] | [20] |
| 2ND ID | [2] | [2] | [1] | [1] | [1] |
| 3RD ID | [1] | [0] | [0] | [1] | [0] |

F I G. 5

| TYPE OF TRANSACTION | ACCEPTANCE OF AN ORDER, SALES, SALES RETURNS | ISSUANCE OF ORDER PURCHASE, PURCHASE RETURNS |
|---|---|---|
| STANDARD WORD LABEL | INPUT WORD LABEL | INPUT WORD LABEL |
| DATE | DATE | DATE |
| DEBTOR CLIENT | CLIENT NAME | / |
| CREDITOR CLIENT | / | CLIENT NAME |
| AMOUNT | AMOUNT | AMOUNT |
| QUANTITY | QUANTITY | QUANTITY |
| ITEM | TRADE NAME | TRADE NAME |
| UNIT PRICE | UNIT PRICE | UNIT PRICE |

F I G. 6

| | 28-1 | 28-2 | 28-3 | 28-4 |
|---|---|---|---|---|
| CODE CONDITION | 1XX0 2XX0 | 1XX0 2XX0 | 1020 | 2010 |
| FILE NAME | ACCOUNT LEDGER | ACCOUNT LEDGER | CREDIT SALES DEMAND LEDGER | DEPT SALES DEMAND LEDGER |
| UPDATE TYPE | ADDITION | ADDITION | ADDITION | ADDITION |
| RK | FILE WORD LABEL / DEBTOR ACCOUNT | FILE WORD LABEL / CREDITOR ACCOUNT | FILE WORD LABEL / DEBTOR CLIENT | FILE WORD LABEL / CREDITOR CLIENT |
| W1 | ACCOUNT / DATE | ACCOUNT / DATE | CLIENT / DATE | CLIENT / DATE |
| W2 | DATE / AMOUNT | DEBIT BALANCE / DEBIT BALANCE | DATE / ITEM | DATE / ITEM |
| W3 | DEBIT BALANCE / CREDIT BALANCE | CREDIT BALANCE / AMOUNT | ITEM / DEBIT BALANCE | ITEM / DEBIT BALANCE |
| W4 | CREDIT BALANCE / | | DEBIT BALANCE / CREDIT BALANCE | DEBIT BALANCE / CREDIT BALANCE |
| W5 | | | QUANTITY / QUANTITY | QUANTITY / QUANTITY |

F I G. 7A

| 28-5 | 28-6 | 28-7 | 28-8 |
|---|---|---|---|
| XX1X | XX2X | 1020 | 1XX0 / 2XX0 |
| ITEM LEDGER | ITEM LEDGER | ITEM MANAGEMENT | ACCOUNT TOTAL |
| ADDITION | ADDITION | SUM UP | SUM UP |
| FILE WORD LABEL | FILE WORD LABEL | FILE WORD LABEL | FILE WORD LABEL |
| STANDARD WORD LABEL | STANDARD WORD LABEL | STANDARD WORD LABEL | STANDARD WORD LABEL |
| ITEM | ITEM | ITEM | DEBTOR ACCOUNT |
| QUANTITY | ITEM | DATE | ACCOUNT |
| | NUMBER OF SUPPLEMENT | QUANTITY | DATE |
| NUMBER OF SUPPLEMENT | NUMBER OF SHIPPING | QUANTITY | DATE |
| NUMBER OF SHIPPING | QUANTITY | AMOUNT | DEBIT BALANCE |
| | | DEBIT BALANCE | AMOUNT |
| | | | CREDIT BALANCE |

FIG. 7B

| CODE CONDITION | 11 | | 21 | | 10 | | 20 | |
|---|---|---|---|---|---|---|---|---|
| FILE NAME | SUPPLEMENT ARRANGEMENT | | SHIPPING ARRANGEMENT | | SUPPLEMENT LEDGER | | SHIPPING LEDGER | |
| UPDATE TYPE | SUM UP | | SUM UP | | SUM UP | | SUM UP | |
| | FILE WORD LABEL | STANDARD WORD LABEL | FILE WORD LABEL | STANDARD WORD LABEL | FILE WORD LABEL | STANDARD WORD LABEL | FILE WORD LABEL | STANDARD WORD LABEL |
| RK | ITEM | ITEM | ITEM | ITEM | ITEM | ITEM | ITEM | ITEM |
| W1 | NUMBER OF SUPPLEMENT | QUANTITY | NUMBER OF SUPPLEMENT | / | NUMBER OF SUPPLEMENT | QUANTITY | NUMBER OF SUPPLEMENT | / |
| W2 | NUMBER OF SHIPPING | / | NUMBER OF SHIPPING | QUANTITY | NUMBER OF SHIPPING | / | NUMBER OF SHIPPING | QUANTITY |

| | 32-1 | 32-2 | 32-3 | 32-4 |

F I G. 8

| STANDARD WORD LABEL | CODE DATA | MEANING OF CODE |
|---|---|---|
| 1ST ID IDENTIFICATION CODES RELATING TO FINANCIAL ASPECT OF TRANSACTION | 10 | SALES |
| | 11 | SALES ITEM REDUCTION |
| | 12 | SALES REDUCTION BY BULK |
| | 13 | MISCELLANEOUS EXPENSES PURCHASE |
| | 20 | PURCHASE |
| | 21 | PURCHASE ITEM REDUCTION |
| | 22 | PURCHASE REDUCTION BY BULK |
| | 23 | MISCELLANEOUS EXPENSES PURCHASE |
| 2ND ID IDENTIFICATION CODES RELATING TO MOVEMENT OF GOODS | 0 | NO MOVEMENT |
| | 1 | RECEIPT OF GOODS |
| | 2 | SHIPPING |
| 3RD ID IDENTIFICATION CODES RELATING TO COMPLETION OR FUTURE COMPLETION OF TRANSACTION | 0 | GOODS SHIPPED AND PAYMENT RECEIVED OR GOODS RECEIVED AND PAYMENT MADE |
| | 1 | ARRANGING OR SCHEDULING SHIPMENT |
| | 2 | ARRANGING OF FUTURE SHIPMENT OR RECEIPT OF GOODS |

CODE CORRESPONDENCE TABLE

F I G. 9

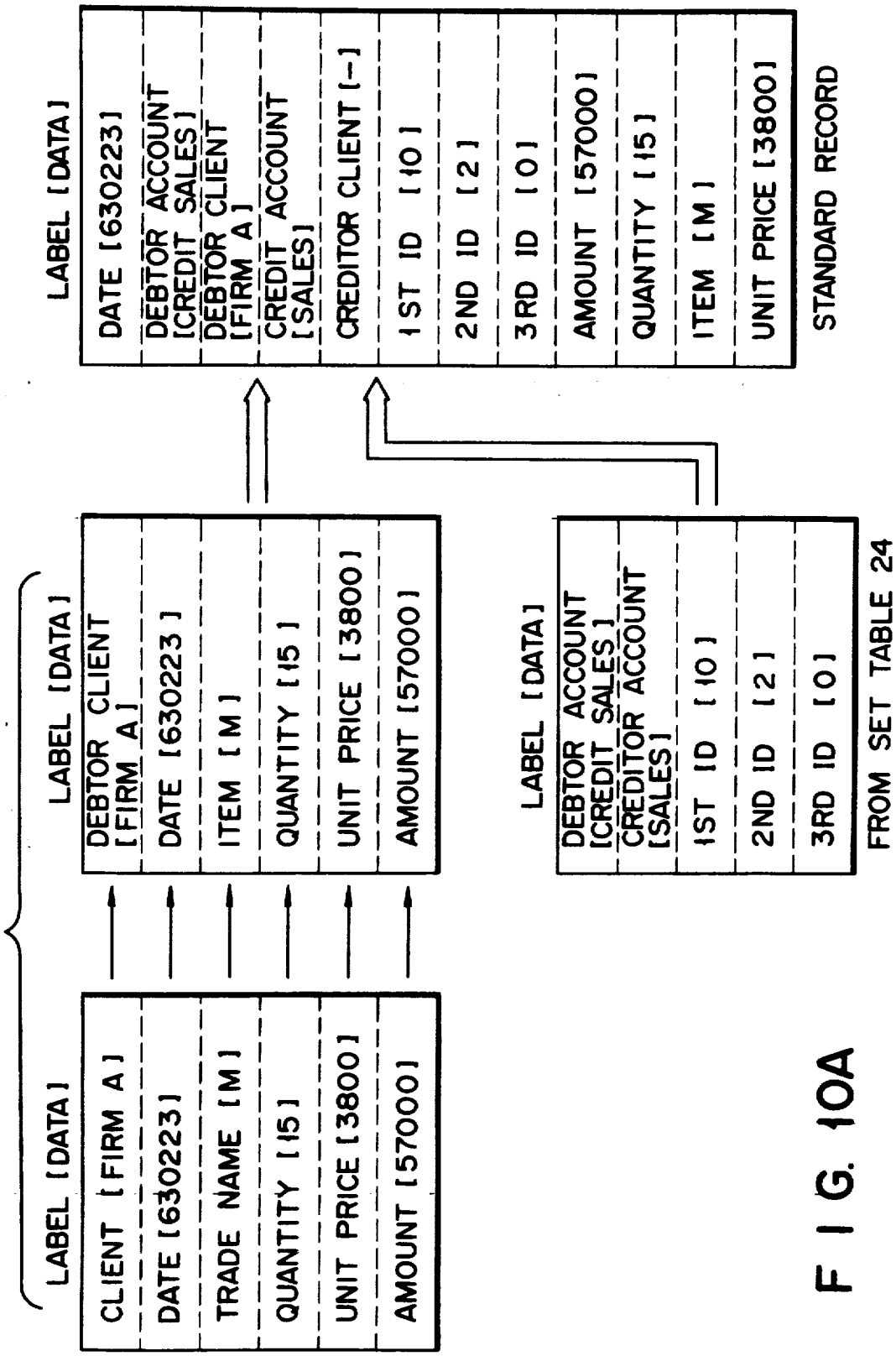
F I G. 10A

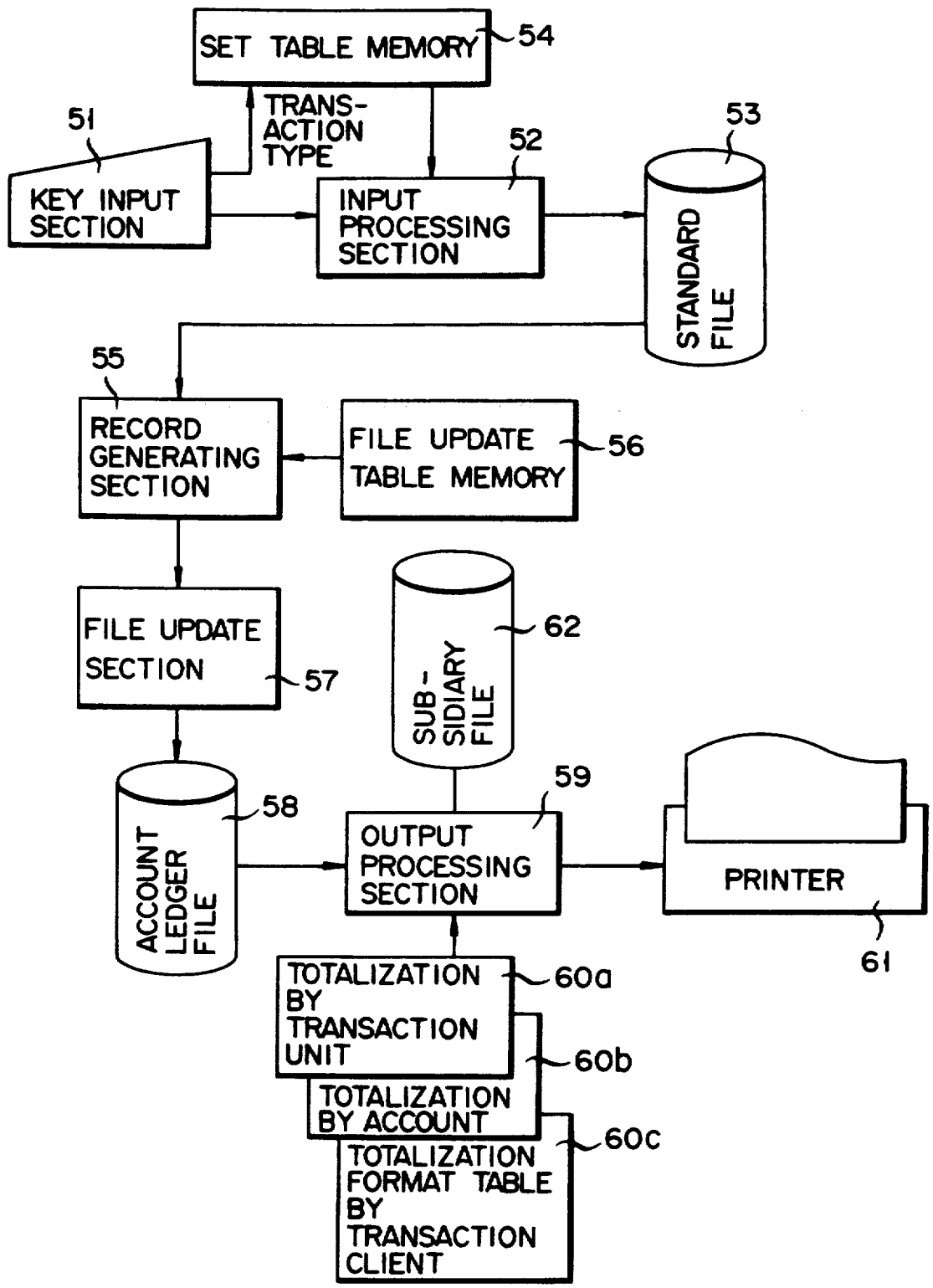
F I G. 11

| TRANSACTION TYPE / STANDARD WORD LABEL | SALES | SALES RETURN | PURCHASE |
|---|---|---|---|
| DEBTOR ACCOUNT | [CREDIT SALES] | [SALES] | [PURCHASE] |
| CREDITOR ACCOUNT | [SALES] | [CREDIT SALES] | [OUTSTANDING BALANCE OF CREDIT PURCHASE] |

| FILE NAME | | ACCOUNT LEDGER | | ACCOUNT LEDGER | |
|---|---|---|---|---|---|
| UPDATE TYPE | | ADDITION | | ADDITION | |
| | | STANDARD WORD LABEL | FILE WORD LABEL | STANDARD WORD LABEL | FILE WORD LABEL |
| RK | | DEBTOR ACCOUNT & DEBTOR CLIENT | TRANSACTION UNIT | CREDITOR ACCOUNT & CREDITOR CLIENT | TRANSACTION UNIT |
| W1 | | DATE | DATE | DATE | DATE |
| W2 | | AMOUNT | DEBIT BALANCE | / | DEBIT BALANCE |
| W3 | | / | CREDIT BALANCE | AMOUNT | CREDIT BALANCE |

FILE UPDATE TABLE 56

F I G. 14

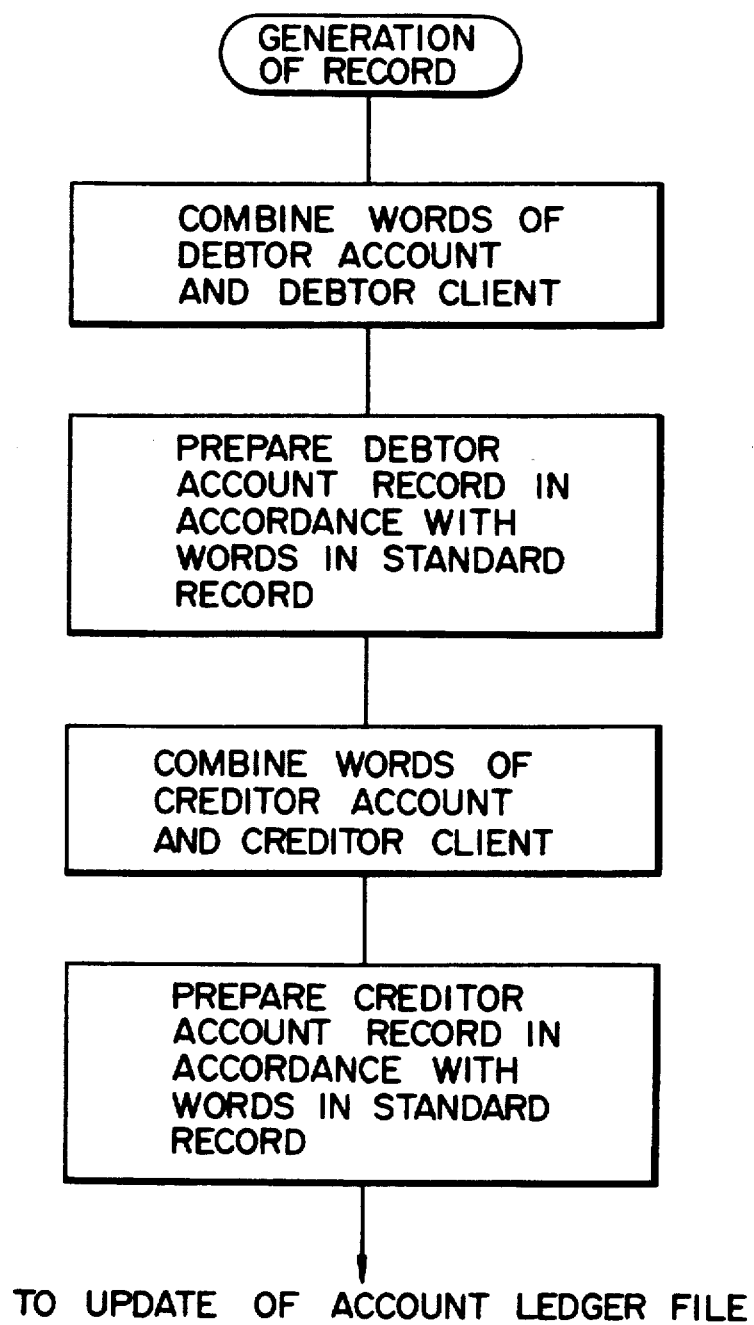
F I G. 16

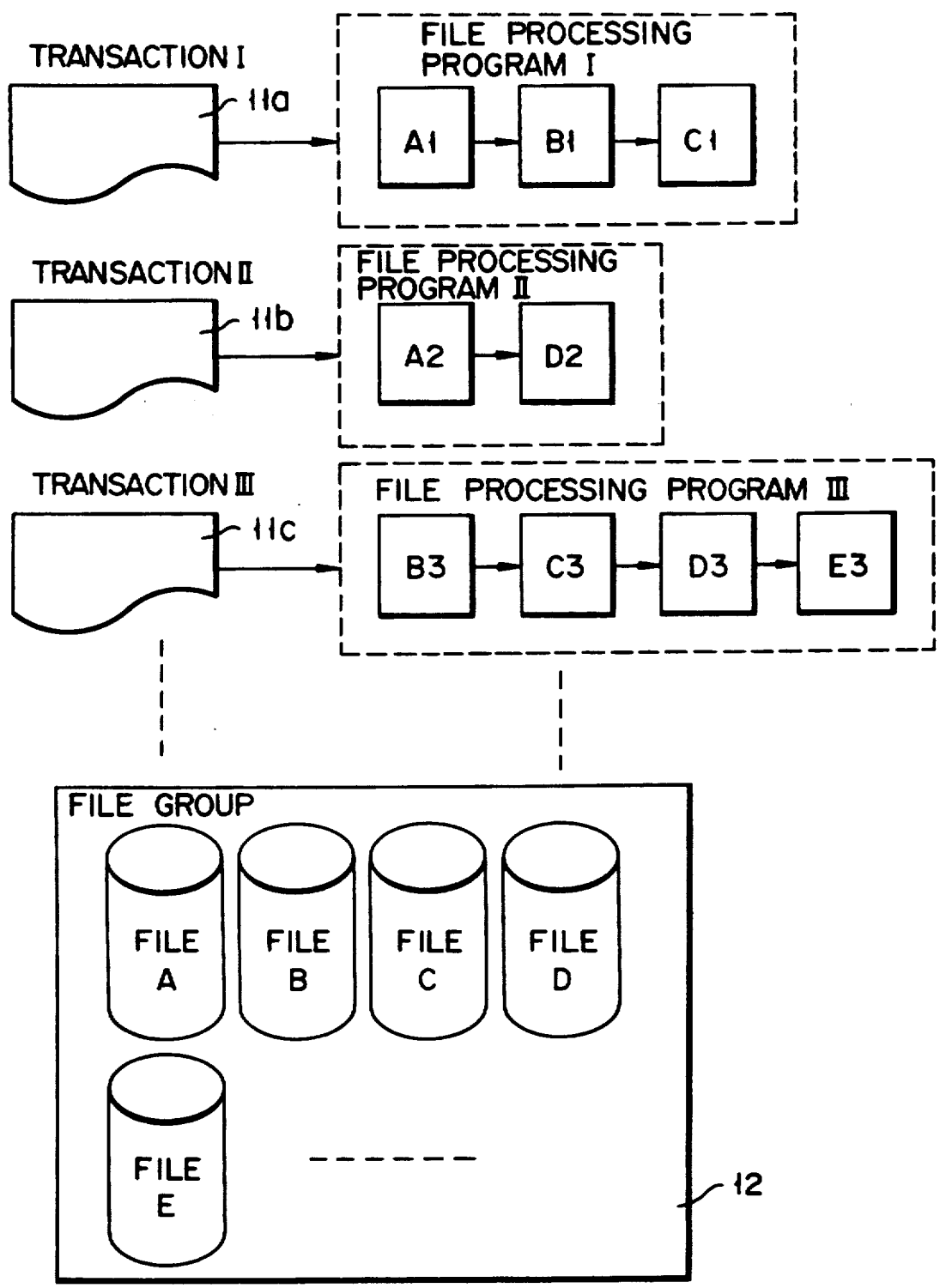
F I G. 17

APPARATUS AND METHOD FOR UPDATING TRANSACTION FILE

This application is a continuation of application Ser. No. 07/360,021, filed Jun. 1, 1989.

BACKGROUND OF THE INVENTION

1. Field of the Invention

The present invention relates to a transaction processing apparatus for processing transaction data by updating various types of files according to data which is input when transactions occur.

2. Description of the Related Art

In a conventional transaction processing apparatus, file processing programs I, II, III, . . . are provided for transactions 11a, 11b, 11c, . . . , as shown in FIG. 17. A set of files 12 comprises a plurality of files A, B, . . . When transactions occur, update programs (A1, A2, . . . ) for file A and update programs (B1, B3, . . . ) for file B and the like must be designed for every type of transaction. For this reason, when the types of transactions are numerous, the design of the system is cumbersome. More specifically, when a system engineer designs a system (programs) in response to a user's demand, he must design programs individually, depending on the types of transactions such as order acceptance, sales, order, and purchase. This is time consuming and requires programming skill.

Further, even after the system is designed, minor amendments may be required for the programs due to a user's request during operation of the system. In this case, a system engineer must correct the program. This correction is time consuming and requires skill, even if it is only a minor amendment. Furthermore, a system design that a user demands cannot always be established due to an insufficient ability of a system engineer. This defect may be derived from a computer itself. More specifically, a conventional office computer is usually a general purpose computer. Therefore, every processing may theoretically be executed by properly designing the programs to deal with the particular processings. In other words, a conventional office computer does not serve as a dedicated transaction apparatus.

Further, the system should be designed to deal with a conventional account book such as a general ledger, a subsidiary ledger, a subsidiary book and the like. More specifically, the forms of bookkeeping and the contents are different depending on industrial sectors and the particular books. Conventionally, accounts such as "ordinary savings", "debt", "sales", "accounts payable" and the like are considered to be a single account and are made to be correspondent to an account such as "cash" and the like.

However, the account such as "cash" itself serves as a single transaction unit, but an account such as "debt" itself does not serve as a single transaction unit. More specifically, the account such as "debt" and the like does not serve as a single transaction unit without having a "client" associated therewith. In the prior art, "debt" and "cash", for example, are treated and sorted as identical accounts and then written in a book such as a general ledger. Therefore, an amount for a single transaction unit cannot be recognized only from the contents written in the general ledger.

SUMMARY OF THE INVENTION

An object of the present invention is to provide a transaction apparatus which can facilitate a system design to handle processing of files in accordance with different types of transactions.

Another object of the present invention is to provide a transaction apparatus which can simply perform modification of a system design for processing of files in accordance with different types of transactions.

A further object of the present invention is to provide a transaction apparatus which can clarify management of transaction records according to accounts by specifying a reference for sorting accounts.

To achieve the above object, according to the present invention, an apparatus is provided for updating various files in accordance with records by transactions, comprising table memory means (28) for storing file names corresponding to code conditions of identification codes designating transaction types; generating means (23) for generating a transaction record including the identification codes; and processing means (27) for retrieving the table memory means in accordance with the identification code included in the transaction record, for selecting all file names corresponding to code conditions satisfying the identification code, and for updating the files corresponding to the selected file names, in accordance with the transaction record.

According to the present invention, types of files to be processed in accordance with different transactions can be simply specified, and therefore the system design for processing files by transactions can be simplified. Further, the modification of the design can also be facilitated by simply changing code conditions.

BRIEF DESCRIPTION OF THE DRAWINGS

FIG. 1 is a block diagram for explaining a first embodiment of the present invention;

FIG. 2 is a view explaining a word arrangement in a standard record;

FIG. 3 is a flowchart explaining the operation of file processing section 27;

FIG. 5 is a view showing the contents of set table 24;

FIG. 6 is a view showing the contents of a word conversion table;

FIGS. 7A and 7B are views showing the contents of file update table 28;

FIG. 8 is a view showing the contents of file update table 32;

FIG. 8 is a view explaining codes set for standard words of "TORIKU", "IRIKU", AND "TEKU" and their meaning;

FIG. 11 is a block diagram for explaining a second embodiment of the present invention;

FIG. 14 is a flowchart showing two record generating operations;

FIG. 16 is a flowchart showing the operation of a record generating section; and FIG. 17 is a conceptional view showing a conventional transaction processing apparatus.

DETAILED DESCRIPTION OF THE PREFERRED EMBODIMENT

Figure 4:
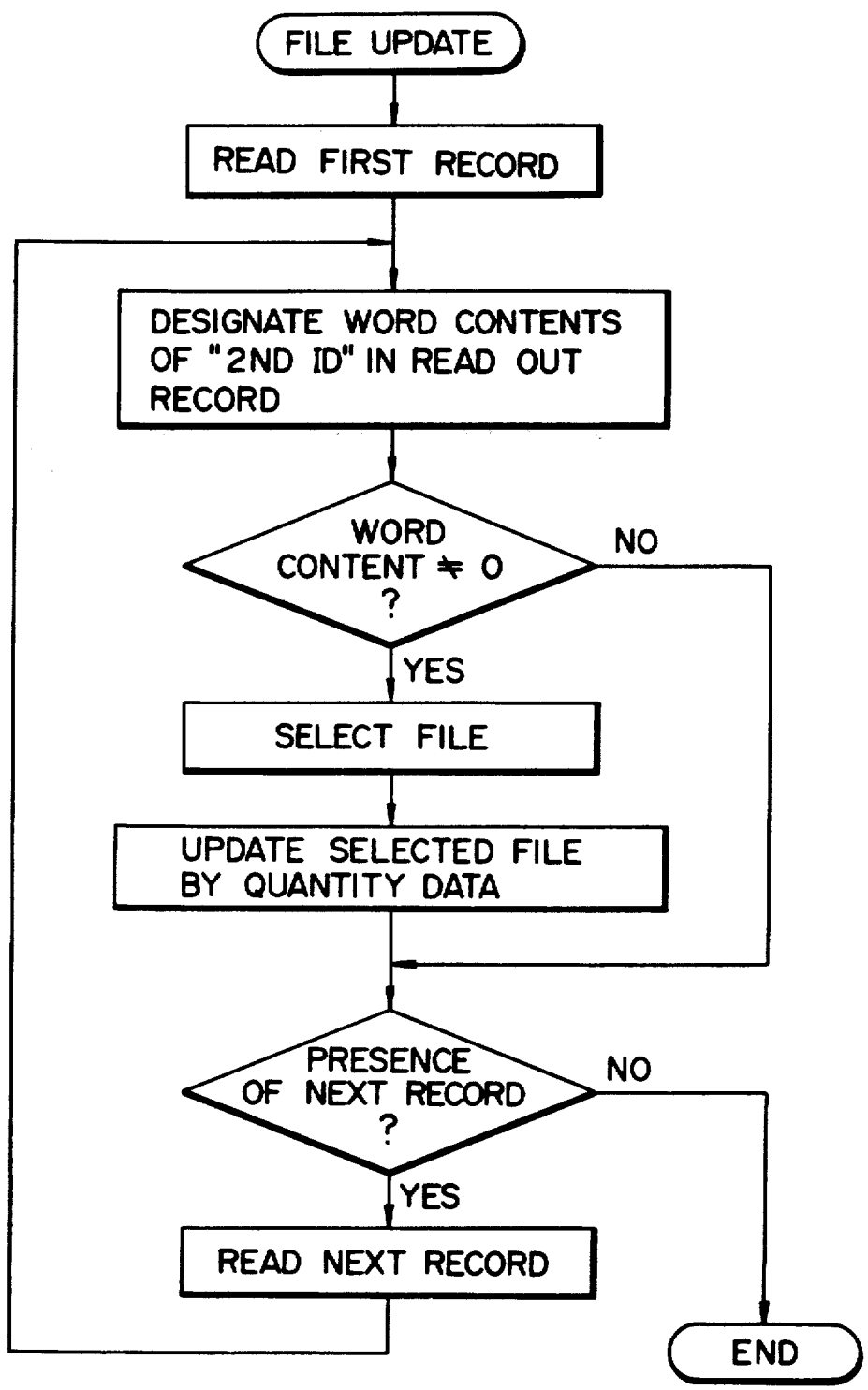
FIG. 4 is a flowchart explaining the operation of file processing section 31.

A first embodiment will now be described with reference to FIGS. 1 through 10.

FIG. 1 shows a system arrangement of a transaction processing apparatus for performing a slip issuing operation, a ledger issuing operation and the like. In FIG. 1, slip input section 21 inputs data for various slips I, II, and the like. Slip input section 21 is provided with mode keys for designating various input modes, designation keys for designating types of transactions, numeric keys, function keys and the like. Data designating types of transactions by slip input section 21 are supplied to determining section 22, and input word data corresponding to the input word labels are supplied to standard record generating section 23.

Determining section 22 determines types of transactions in accordance with the designation data supplied from slip input section 21, and designates types of transactions stored in set table (memory) 24 and in word conversion table (memory) 25 which are described in detail later. Set table 24 and word conversion table 25 are connected to standard record generating section 23. Standard record generating section 23 generates a single transaction record (hereinafter referred to as a standard record) based on a peculiar transaction word data (hereinafter referred to as word data) which is read out from set table 24 corresponding to the transaction type, and a standard word data obtained by converting the input word data into a data of a standard word using word conversion table 25. Section 23 writes the generated standard record in standard record file 26. This standard record has a word arrangement as shown in FIG. 2. More specifically, a predetermined number of standard words such as "date", "debtor account", "a debtor client", "a creditor account", and the like are arranged in a predetermined order. The above respective words are called standard words and a record comprising the standard words is called a standard record. This is because all the input records are stored and managed as unified records of a single type independent of the types of input slips (independent of the number, type, and arrangement of input words). The standard records generated for every transaction are stored in standard record file 26. Each standard record written in standard record file 26 is read in file processing section 27 when an update instruction is given from file update instructing section 41. File processing section 27 designates files to be updated in accordance with file update table (memory) 28 to be described later. Further, section 27 prepares update records corresponding to the respective files in accordance with the standard records, and performs update processing operations such as addition and totaling for designated files such as account ledger file 29a, credit sales demand ledger file 29b, item management file 29n and the like.

FIG. 3 is a flowchart showing the file update operation.

As seen in FIG. 1, each standard record stored in standard record file 26 is also supplied to remote terminal unit 30 on, for example, a warehouse side which is connected on-line to a host unit. Terminal unit 30 comprises file processing section 31, file update table (memory) 32, supplement arrangement file 33a, shipping arrangement file 33b, supplement ledger file 34a, and shipping ledger file 34b. The term "supplement" is used herein to denote goods ordered by a company or firm, and which are to be received and stored, for example, in a warehouse. File processing section 31 sequentially reads, in response to a file update instruction from file update instructing section 41, the standard records from standard record file 26, identifies codes which are specified words in the respective standard records which have been read out, and updates any one of files 33a, 33b, 34a, and 34b by referring to file update table 32. FIG. 4 is a flowchart showing its operation.

Set table 24, word conversion table 25, and file update tables 28 and 32 are set as shown in FIGS. 5 through 8.

Word conversion table 25 and file update tables 28 and 32 can be arbitrarily set by a user (or a system engineer). Word conversion table 25 can be arbitrarily set in correspondence between the input words and the standard words by using word labels. Files to be updated according to transaction types can be arbitrarily set in file update tables 28 and 32. Set table 24 fixedly stores word data corresponding to specific standard word labels necessary for generating the standard records. Various word data peculiar to each transaction are preliminarily stored in table 24 according to transaction types.

The above mentioned tables will now be described in detail.

Set table 24 stores, as shown in FIG. 5, word data corresponding to the respective standard word labels such as "a debtor account", "a creditor account", "1ST ID", 2ND ID", "3RD ID" by transaction types such as "acceptance of order", "sales", "sales returns", "issuance of order", "purchase" and the like. For example, as the data corresponding to the standard word of "debtor account", account code data indicating "credit sales", "sales", "purchase" and the like are preliminarily stored according to transaction types. Similarly, as the data corresponding to the standard word of "creditor account", account code data indicating "sales", "credit sales", "debt credit purchase" and the like are preliminarily stored. Furthermore, as the data corresponding to the respective standard words of "1ST ID", "2ND ID", and "3RD ID", the specified code data shown in code correspondence table in FIG. 9 are preliminarily stored according to transaction types. These data corresponding to the words of "1ST ID", "2ND ID", and "3RD ID" are identification code data corresponding to transaction types.

The word of "1ST ID" is an identification code relating to a financial aspect of transaction, the word of "2ND ID" is an identification code relating to movement of goods, and the word of "3RD ID" is an identification codes relating to completion or future completion of a transaction.

FIG. 9 shows types of code data corresponding to the respective standard words of "1ST ID", "2ND ID", and "3RD ID". More specifically, as the standard word of "1ST ID", 8 types of code data designated by "10" through "23" are provided. These code data are classified from a view point of "movement of money". Further, as the standard word of "2ND ID", three types of code data designated by "0", "1", and "2" are provided. Code data "0" indicates no occurrence of movement of articles (receipt and shipping of articles) by the transaction; code data "1" indicates receipt of articles by the transaction; and code data "2" indicates shipping of articles by the transaction. As the standard word of "3RD ID", three types of code data of "0", "1", and "2" are provided. Code data "0" indicates that goods shipped and payment received, or goods received and payment made. Code data "1" indicates arranging or scheduling shipment. Code data "3" indicates arranging for future shipment or receipt of goods. More specifically, the respective standard words of "2ND ID", and "3RD ID" are used to classify the transaction contents from a view point of "movement of articles". Accordingly, all of the transactions can be represented by combining the standard word of "1ST ID" and the standard words of "2ND ID and "3RD ID". For example, a transaction of "acceptance of an order" is to deliver goods to the client and to receive money. More specifically, the transaction "acceptance of order" occurs immediately before a transaction of "sales". In "1ST ID", a transaction of "acceptance of order" corresponds to code data "10" which is same as that of a transaction of "sales", and also code data "2" in "2ND ID" which indicates shipping of articles. Further, since the transaction "acceptance of order" occurs after the arrangement of movement of articles, it corresponds to code data "1" in "3RD ID".

Word conversion table 25 is used to make a correspondence between the input words and the standard words by using the word labels according to transaction types. Table 25 is utilized to convert the input word corresponding to the input word label into a word data corresponding to the standard word label. Accordingly, by using the above described set table 24 and word conversion table 25, data of the standard record comprised of the standard words shown in FIG. 2 can be prepared.

File update table 28 on the host unit side is utilized to update various files in accordance with the standard records stored in standard record file 26. A user can set arbitrary code conditions, file names, and types of update in table 28 as shown in FIGS. 7A and 7B. Furthermore, keyword RK and update words W1 through W5 are set in table 28. As the "file name", file names for various files such as "account ledger", "credit sales demand ledger", "debt sales demand ledger", "item ledger", "item management", "account total" and the like are set. As the update types, "addition", "total" and the like are set in table 28. The code conditions define conditions of codes corresponding to "1ST ID", "2ND ID", and "3RD ID" of three standard words for specifying transaction contents, and comprises four digits. Among the four digits of data, the upper two digits of data are assigned, code conditions of "1ST ID" and the lower two digits of data are assigned code conditions of "2ND ID" and "3RD ID". Symbol "x" included in the code condition indicates that a digit content of the standard word corresponding to the digit can be any value. For example, if "1xx0" is set as the code condition, the code corresponding to the standard word of "TORIKU" is "1x". In other words, the code corresponding to the standard word of "1ST ID" may be any one of "10", "11", "12", and "13". Further, if the code corresponding to the standard word of "2ND ID" is "x", i.e., no condition is set, and the code corresponding to the standard word of "3RD ID" is "0". Further, if "xx2x" is set as the code condition, the code corresponding to the standard word of "1ST ID" is "xx" which means that no condition is set; the code corresponding to the standard word of "2ND ID" is "2"; and the code corresponding to the standard word of "3RD ID" is "x" which means that no condition is set.

Keyword RK and update word W1 through W5 set the correspondence between "file words" and "standard words" by using the word labels. For example, in account ledger file, "account", "date", and "debit balance" are set as the file word label, and "debtor account", "date", "amount" are set as the standard word label in table 28-1. In table 28-2, "account", "date", and "credit balance" are set as the file label, and "creditor amount", "date", and "amount" are set as the standard word label. When file update table 28 is set, a user (or a system engineer) must determine files, and the contents of updating the files according to the transaction types. Thereafter, the code conditions, file names, and the types of update are sequentially set, and the file words are set corresponding to the standard words. Thus, the update processing of desired type can be performed for a desired file in accordance with the standard record. For example, when the code indicating transaction content specified by the codes corresponding to the standard words of "1ST ID", "2ND ID", and "3RD ID" is "1020" (sales), the code satisfies the code condition "1xx0" in tables 28-1 and 28-2. Therefore, two update records for the account ledger file are prepared in accordance with tables 28-1 and 28-2, and added to the account ledger file. These two update records differ from each other in that one record uses the standard word of "debtor account" as the keyword, and the other uses the standard word of "creditor account" as the keyword. Further, since the code conditions are also set in table 28-8, the update record for the account total file is also prepared, and summed up to the account total file. Further, since the code "1020" satisfies code condition "xx2x" in table 28-6, the update record for the item ledger file is prepared using table 28-6, and added to the item ledger file. As this code coincides with the code conditions of tables 28-3 and 28-7, the addition and the sum up are also performed for the credit sales demand ledger file and item management file.

As described above, the respective update records for a plurality files can be prepared from a single standard record and the corresponding files can be updated. Furthermore, the conditions necessary for updating the files can be simply set by using file update table 28.

Further, file update table 32 in the remote terminal unit 30 is utilized for updating, in accordance with the standard records stored in standard record file 26, files 33a, 33b, 34a, and 34b provided in terminal unit 30. File update table 32 comprises as shown in FIG. 8 "code condition", "file name", "types of update", and word arrangement. As the code condition, the code data corresponding to the standard words of "2ND ID" and "3RD ID" are set. More specifically, as the code condition of arrangement file 33a, "11" is set since a transaction record is summed up to file 33a when a transaction regarding arrangement of receipt of goods, e.g., a transaction of issuance of order occurs. Similarly, as the code condition of arrangement file 33b, "21" is set since a transaction record is summed up to file 33b when a transaction regarding arrangement of shipping, e.g., a transaction of acceptance of an order occurs. Further, as the code condition of ledger file 34a, "10" is set since a transaction record is added to file 34a when a transaction regarding completion of receipt of goods, e.g., a purchase transaction occurs.

Keyword RK and update words W1 and W2 set the correspondence between "file words" and "standard words" by using the word labels. In each of the supplement arrangement file, shipping arrangement file, supplement ledger file, and shipping ledger file, "item", "number of supplement", and "number of shipping" are set as the file word label. More specifically, in supplement arrangement file and supplement ledger file, a file word of "item" corresponds to a standard word of "item", and a file word of "number of supplement" corresponds to a standard word of "quality". In the shipping arrangement file and shipping ledger file, a file word of "item" corresponds to a standard word of "item", a file word of "number of shipment" corresponds to a standard word of "quantity".

A basic operation of the above embodiment will now be described.

When transactions occur, a type of transaction is designated from slip input section 21. Input section 21 supplies the designated transaction type to determining section 22. A series of input word data, corresponding to the input word labels from slip input section 21, are supplied to standard record generating section 23 as an input record.

The type of the transactions in set table 24 and word conversion table 25 are designated by the determination output from determining section 22. Standard record generating section 26 prepares the standard record corresponding to the input record in accordance with the table contents. For example, if "sales" is designated as the type of transaction, the respective data of "credit sales", "sales", "10", "2", and "0" are read out from set table 24, as the data corresponding to the respective standard words of "debtor account", "creditor account", "1ST ID", "2ND ID", and "3RD ID". Word conversion table 25 stores the correspondence between the standard words and the input words, such as a correspondence between the standard word of "date" and the input word of "date", a correspondence between the standard word of "a debtor client" and the input word of "a client name", a correspondence between the standard word of "amount" and the input word of "amount", and the like. Accordingly, the data corresponding to the input word labels are converted into the data corresponding to the standard word labels in accordance with the correspondence. Further, since the data corresponding to the standard word labels are read out from set table 24 and supplied to standard record generating section 23, the single standard record is generated in accordance with these converted data and the read out data, and then written in standard record file 26. The standard record is generated every time the input record regarding one transaction occurs, and written in standard record file 26. When the standard record is supplied to file processing section 27 in response to an instruction from file update instructing section 41, section 27 sequentially reads the standard records from standard record file 26, and performs a processing operation in accordance with the file update table 28. File processing section 27 checks the code conditions of file update table 28 from the code data corresponding to the respective standard words of "1ST ID", "2ND ID", and "3RD ID" in the standard record. Section 27 selects file whose code conditions coincide with the code data. In other words, section 27 extracts all of the code conditions which satisfy the code data and selects files corresponding to the extracted code conditions. Section 27 determines the update type, and performs the conversion between the standard words. Accordingly, section 27 prepares the file update records corresponding to the respective files and performs the update processing operations corresponding to the respective files. Similar operations are performed and arbitrary update can be executed to desired files when transactions such as "purchase", "acceptance of an order" and the like are designated.

Figure 10B:
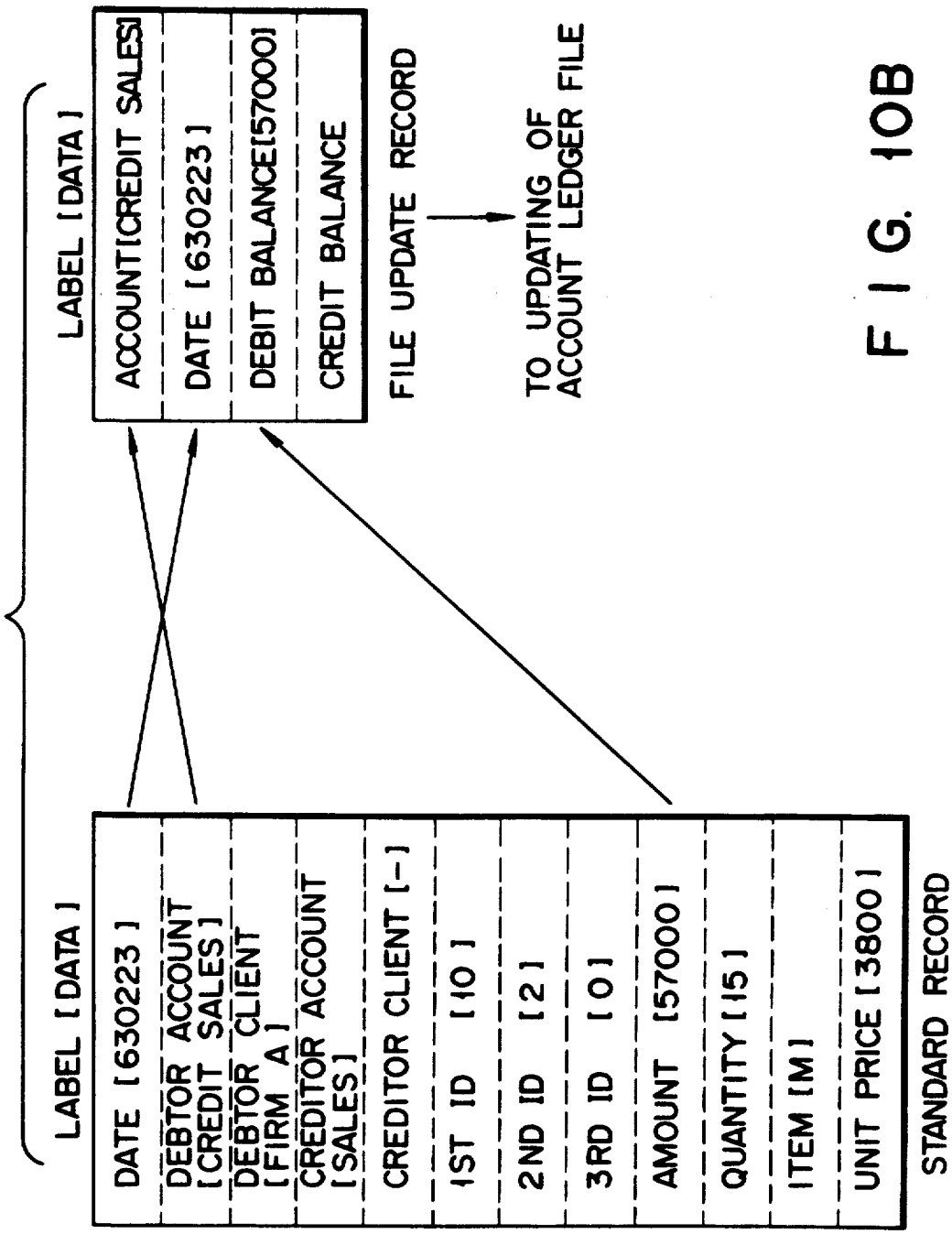
FIGS. 10A through 10B are views for explaining the contents of a record during a processing operation.
Figure 10C:
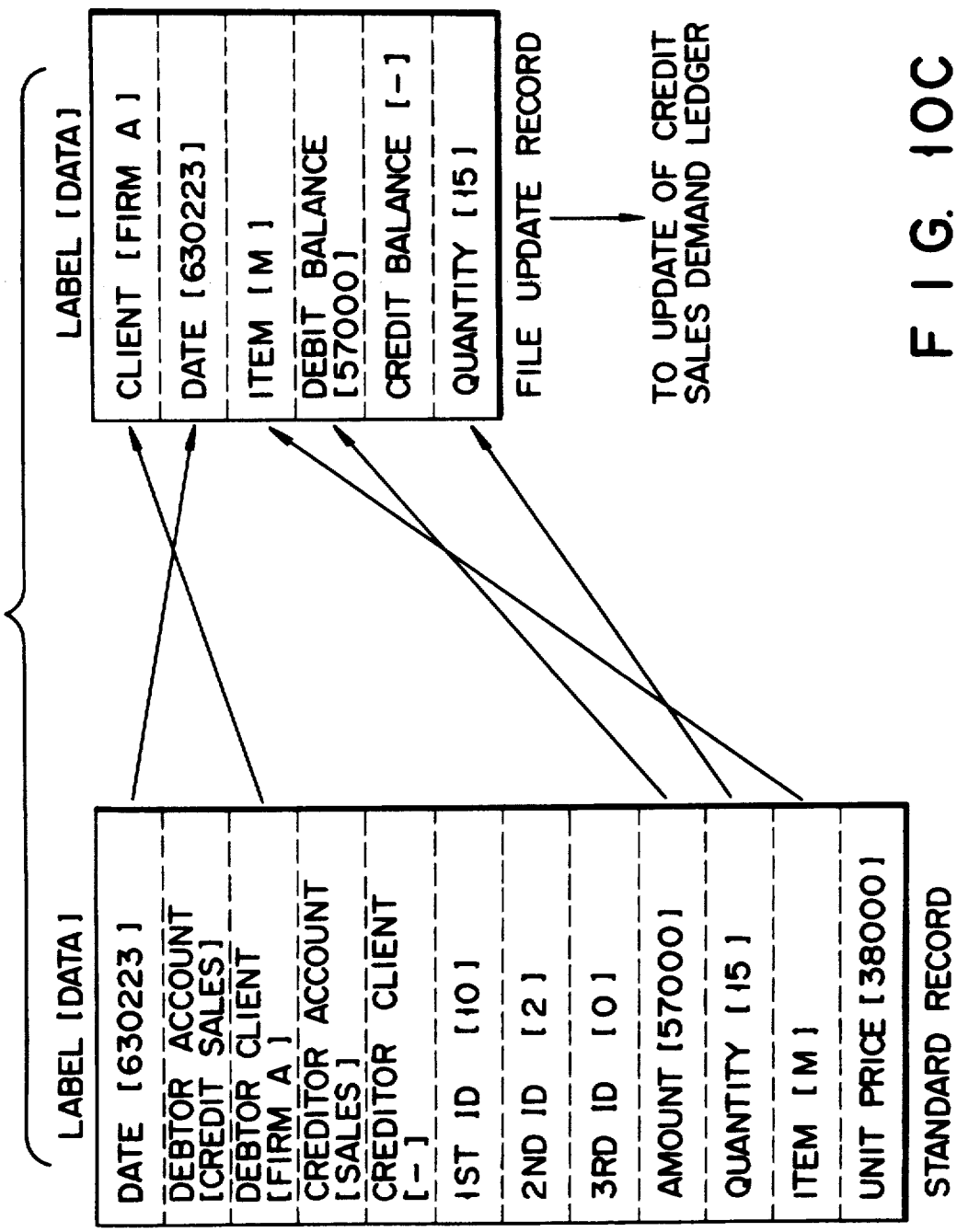
Figure 10D:
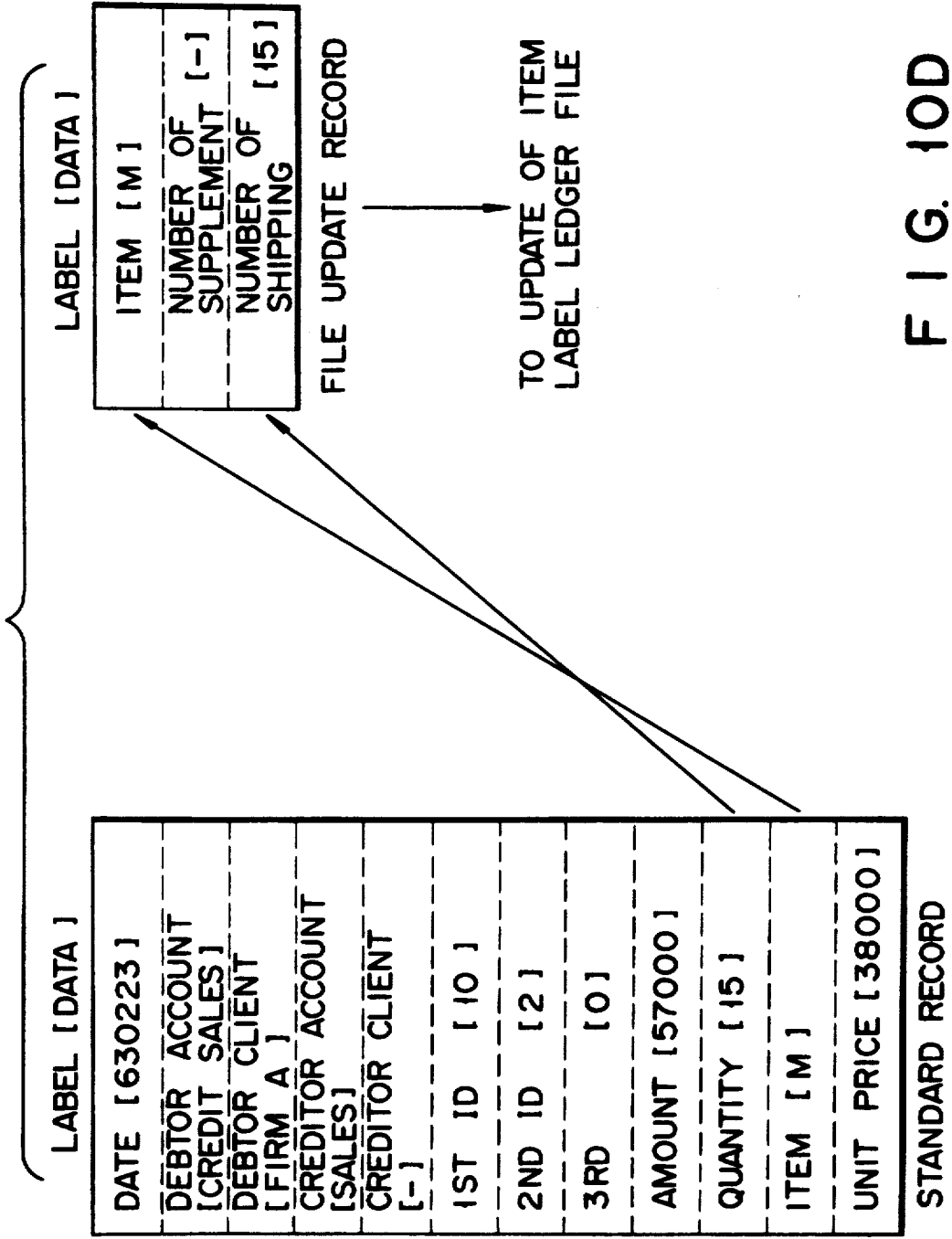
Figure 10E:
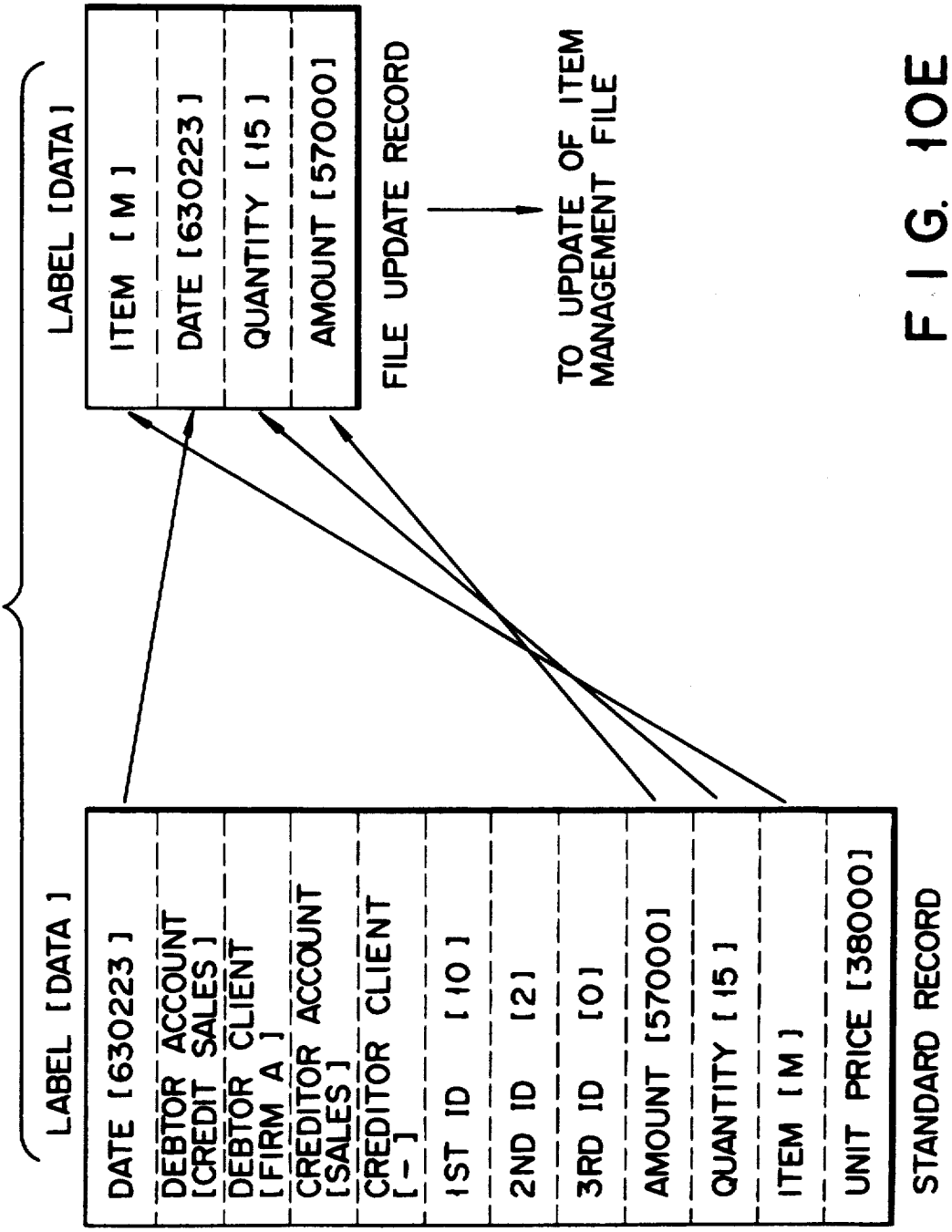

FIGS. 10A through 10E show the contents of the respective records such as the input record, standard record, and file update record when "sales" is designated as the transaction type, for example. More specifically, FIG. 10A is a view for explaining the preparation of the standard record from the input record, and FIGS. 10B through 10E are views for explaining the record contents when the various file update records are prepared from the standard record.

A detailed operation when a transaction occurs will now be described by way of example, where a sales transaction occurs in a sales office. In the case of a sales transaction, the steps of "receipt of an order" from a client, "arrangement" of articles to warehouse due to the receipt of an order, "shipping" of articles from the warehouse due to the arrangement, and delivery of articles to the client ("sales") are sequentially carried out. The operations of the respective transactions will be described.

When a request of purchasing articles is issued from a client to a sales office, an "order slip" must be issued. Thus, "acceptance of an order" is designated as the transaction type by slip input section 21. More specifically, the word data are sequentially input from a keyboard corresponding to the respective word labels such as "client name", "date", "article name" and the like in accordance with the format of the order slip. The input data are supplied to standard record generating section 23.

On the other hand, a designation data representing that the "acceptance of an order" has been designated as the transaction type is supplied to determining section 22. The transaction types in set table 24 and word conversion table 25 are designated by the determination output from the determining section 22. Thus, the table contents are read in standard record generating section 23. Standard record generating section 23 generates a standard record for one input record in accordance with the standard word data obtained by converting the input record as the data corresponding to the standard word labels, and the standard word data read out from set table 24, and then writes the generated record in standard record file 26.

File processing section 27 reads out the standard record stored in standard record file 26, and processes the read out record in accordance with the contents of file update table 28. First, file processing section 27 checks the code conditions in file update table 28 from the code data corresponding to the standard word labels of "1ST ID", "2ND ID", and "3RD ID" in the standard record. Then, section 27 selects all the files whose code conditions coincide with the code data, generates file update records corresponding to the respective selected files, and performs the update processing operations. In this example, since the code of "acceptance of an order" is "1021", the file-updating record for item ledger file are generated in accordance with file update table 28-6, and the update of addition is performed for the item ledger file.

Further, the standard records stored in standard record file 26 are also supplied to terminal unit 30 on the warehouse side. File processing section 31 in terminal unit 30 checks the code conditions in the standard record and selects files which coincide with the code conditions by referring to file update table 32. In this example, since the code of "acceptance of an order" is "1021", section 31 selects shipping arrangement file 33b, generates the updating record for shipping file 33b based on the word data corresponding to the standard word labels of "item" and "quantity" in the standard record. Then, section 31 sums up the generated update record to shipping file 33b.

Supplement arrangement file 33a and shipping arrangement file 33b are used to manage the arrangement status of the various articles in the warehouse. By checking the contents of these files, one can easily know which article is arranged as the supplement or the shipping in what quantity.

In this example, the arrangement of shipping is requested to the warehouse responsive to the transaction of "acceptance of an order". Accordingly, the requested articles are collected by the requested amount at the warehouse. The collected articles are shipped to the sales office. The sales office is required to complete its arrangement by receiving the articles conveyed from the warehouse, to deliver the articles to the client and to issue the "sales slip". Thus, the "sales" is designated as the transaction type by slip input section 21, and various word data are input in accordance with the format of the sales slip. Thus, similar to the operation when the transaction of "acceptance of order" occurs, the standard record for the "sales" is generated in accordance with the set table 24 and word conversion table 25, and then written in standard record file 26. File processing section 27 reads the standard record from standard record file 26, and checks the code condition of file update table 28. In this example, since the code representing the type of the transaction of "sales" is "1020", the account ledger file, the credit sales demand ledger file, item ledger file, item management file, and account total file are selected, and file-update records for the respective files are prepared.

The account ledger file is used to manage the receipt and payment of money in the sales office. By checking the contents of the file, the respective amounts of the accounts such as cash, deposit, accounts receivable, outstanding balance of credit purchases, debt and the like can easily be recognized. By summing up all the account ledger files provided in the respective sales offices and the head office, the total sales of goods can be recognized.

Further, the standard record stored in standard record file 26 is also supplied to terminal unit 30 on the warehouse side. Unit 30 checks the codes in the standard record and selects the files corresponding to the codes. In this example, since the code of the transaction type of "sales" is "1020", shipping ledger file 34b is selected, and the total of the shipping quantity is updated.

As described above, when sales transactions occur, the transactions are operated on in the order of acceptance of an order to sales. According to the present embodiment, the standard record is generated for every occurrence of a transaction, and the corresponding files in the sales office corresponding to managing of money are updated in accordance with the standard record, and the respective files corresponding to managing supplement and shipping of articles and handled by terminal unit 30 on the warehouse side are also updated.

In the above embodiment, the example is for a sales transaction. Similar operations can be performed for a purchasing transaction or for a transaction of returned goods.

A second embodiment will now be described with reference to FIGS. 11 through 16.

FIG. 11 shows a block diagram of an entire transaction processing apparatus according to the present invention. In FIG. 11, various transaction data input from key input section 51 are input to input processing section 52. Input processing section 52 generates a standard record comprised of a word arrangement shown in FIG. 12 in accordance with the input record for one transaction, and writes it in a standard record file 53. The standard record 53 comprises 9 types of standard words. These standard words are "date", "amount", "item", "quantity", "unit price", a pair of words of "a debtor account" and "a creditor account" wherein the transaction contents are classified into a debit and a credit in accordance with the book keeping procedures, and a pair of client words of "a debtor client" and "a creditor client" for clarifying the clients with respect to both accounts. Most of these words are sequentially input from key input section 51. However, both the standard words of "a debtor account" and "a creditor account" are automatically input from set table (memory) 54. Set table 54 outputs word data corresponding to the word labels of "a debtor account" and "a credit account" according to the transaction types such as "sale", "sales returns", "purchase" and the like which are designated from key input section 51.

Figures 12, 13:
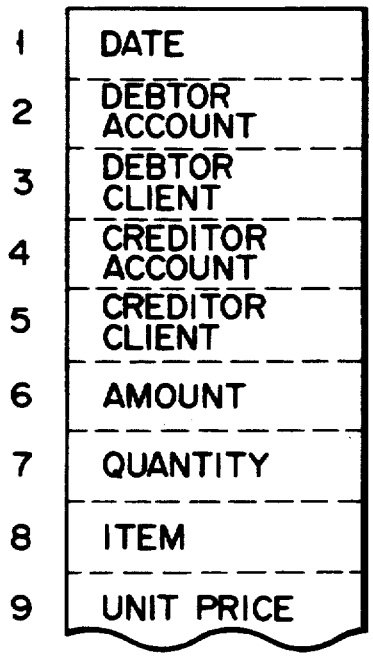
FIG. 12 is a view explaining a word arrangement of a standard record.
FIG. 13 is a view explaining a case where two account records are generated from a single standard record.

FIG. 13 shows a content of set table 54. For example, if the transaction type is "sale", set table 54 outputs a word data of "credit sale" corresponding to a word label of "a debtor account", and outputs a word data of "sales" corresponding to a word label of "a creditor account".

The standard record stored in standard record file 53 as described above when a transaction occurs, is read in record generating section 55. Record generating section 55 generates, by referring to file update table (memory) 56, an account record of a debit and an account record of a credit in accordance with a standard record read out from standard record file 53. File update table 56 indicates a correspondence between file words of the account record to be generated and standard words of the standard record. The contents of table 56 is shown in FIG. 14.

In an account ledger file, a keyword RK is transaction unit, and update words W1 through W3 are "date", "debit balance", and "credit balance". File words of the keyword RK and update words W1 through W3 correspond to standard words. With respect to the account record of the debit, the file word of "transaction unit" corresponds to a combined word comprised of the standard words of "debtor account" and "debtor client", and the file words of "date" and "debit balance" correspond to the standard words of "date" and "amount". On the other hand, with respect to the account record of the credit, the file word of "transaction unit" corresponds to a combined word comprised of the standard words of "creditor account" and "creditor client", and the file words of "date" and "credit balance" correspond to the standard words of "date" and "amount".

Figure 15:
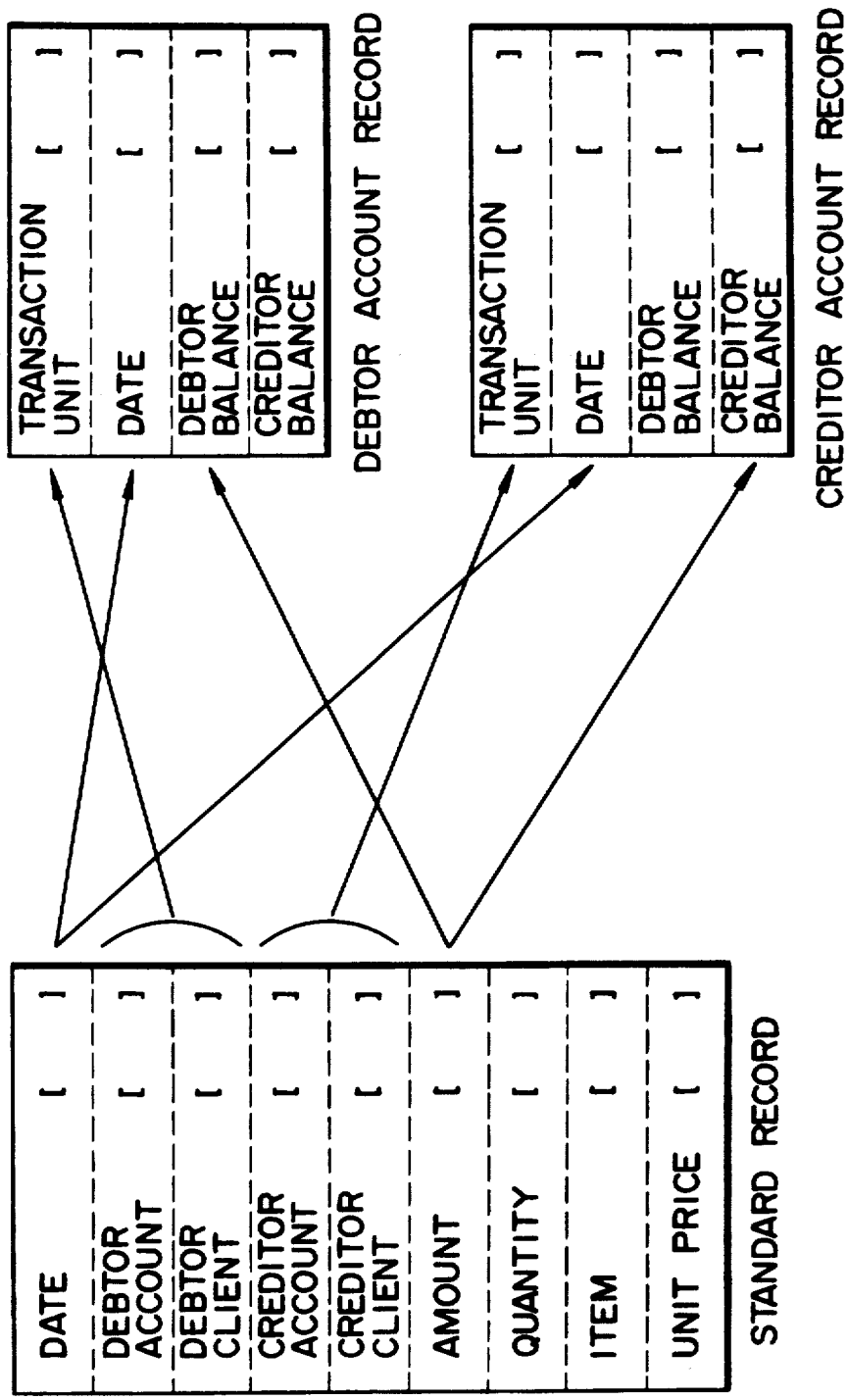
FIG. 15 is a view for explaining a design of a file processing operation in a conventional transaction processing apparatus.

FIG. 15 shows a status of generating two types of account records (a debtor account record and a creditor account record) from a single standard record by record generating section 55 and with reference to file update table 56. FIG. 16 shows a flowchart showing an operation of record generating section 55.

As described above, from a single standard record indicating the content of one transaction, a debtor account record and a credit account record are simultaneously prepared. The debtor and credit account records are obtained by classifying the account data by the account of a debit side and the client, and by the account of a credit side and the client. The account record pair thus prepared are output to file update section 57. File update section 57 incorporates an update program for updating the account ledger file 58 whose record comprises the respective file words of "transaction unit", "date", "debit balance", and "credit balance". Thus, section 57 updates account ledger file 58 based on the two account records. Each record in account ledger file 58 which is updated by using "transaction unit" as the keyword is supplied to output processing section 59. Output processing section 59 rearranges the contents in the respective records, in accordance with a totalization format table by transaction unit (by accounts and clients) 60a, totalization format table by accounts 60b, and totalization format table by clients 60c. Then, section 59 prepares a print format, and outputs the rearranged data to printer 61.

When outputting data by transaction unit is requested, the totalization records by keywords stored in account ledger file 58 are read out in accordance with the totalization format table 60b, and output to printer 61. When outputting data by accounts is requested, the keywords of the respective totalization records stored in account ledger file 58 are divided into two words. The keyword is formed by combining the account word and the client word, and is therefore easily divided. Then, the totalization records are totalized again according to the word of "account" in the divided upper keyword, and then sequentially stored in subsidiary file 62. When all the totalization records stored in account ledger file 58 are retotalized and stored in subsidiary file 62, the totalized records stored in subsidiary file 62 are read out in accordance with the totalization format table 60b, and output to printer 61. Further, when outputting data by client is requested, each keyword in the respective totalization records stored in account ledger file 58 is divided into two words, and the totalization records are retotalized according to the word of "client" included in the divided upper keyword, and then sequentially stored in subsidiary file 62. When all the totalization records stored in account ledger file 58 are retotalized and then stored in subsidiary file 62, the totalization records stored in subsidiary file 62 are read out in accordance with totalization format table 60c and then output to printer 61.

An operation of the second embodiment will now be described.

When a transaction occurs, an operator designates the transaction type and inputs input records by key input section 51. Input processing section 52 prepares a standard record for one transaction in accordance with set table 54 and stores it in standard record file 53. Record generating section 55 reads the standard record stored in standard record file 53, and prepares two account records by referring to file update table 56. The two account records are an account record using the debtor account and a debtor client as a keyword, and an account record using the creditor account and a creditor client as a keyword. Thus, the two types of account records are prepared from data of one standard record from a view point of a debit side and a credit side. The account record pair thus prepared are read in file update section 57 to update account ledger file 58. This update is a totalization of account ledger file 58 by using the file word of transaction unit in the account record as the keyword. The totalization records by the keyword of file word of "transaction" are stored in account ledger file 58. Accordingly, the totalization data by transaction unit can be prepared in accordance with the respective totalization records stored in account ledger file 58. Further, the totalization data by accounts and the totalization data by transaction units can also be prepared by dividing each keyword in the totalization records and by retotalizing the totalization records according to the divided keyword.

What is claimed is:

1. An apparatus for updating files, comprising:
   (A) input table memory means for storing an input table including a plurality of third labels;
   (B) first table memory means for storing a first table including a plurality of first labels and said third labels, said third labels being in one-to-one correspondence with the first labels;
   (C) input data memory means having an input data memory corresponding to said input table, said input data memory storing data items and the third labels included in the input table, said third labels being in one-to-one correspondence with each of the data items;
   (D) file memory means for storing a file corresponding to the first table, said file including data items and first labels included in the first table, said first labels being in one-to-one correspondence with each of the data items;
   (E) data input means, coupled to said input table memory means and to said input data memory means, for inputting data items which are designated to have a one-to-one correspondence with one of the respective third labels included in the input table, and for storing the input data items along with the corresponding third labels in said input data memory;
   (F) read out means, coupled to said input data memory means and to said first table memory means, for reading, from the input data memory, a data item corresponding to the third label which coincides with the third label included in the first table; and
   (G) update means, coupled to said read out means, to said first table memory means, and to said file memory means, for updating, in the file, a data item corresponding to the third label included in the first table, in accordance with the readout data item.

2. An apparatus for updating files, comprising:
   (A) input table memory means for storing an input table including a plurality of third labels;
   (B) first table memory means for storing a first table including a plurality of first labels and said third labels, said first labels being in one-to-one correspondence with the first labels;
   (C) second table memory means for storing a second table including a plurality of second labels and said first labels, said first labels being in one-to-one correspondence with the second labels;
   (D) input data memory means having an input data memory corresponding to said input table, said input data memory storing data items and third labels included in the input table, said third labels being in one-to-one correspondence with each of the data items;

(E) first file memory means for storing a first file corresponding to the first table, said first file including data items and first labels included in the first table, said first labels being in one-to-one correspondence with each of the data items;

(F) second file memory means for storing a second file corresponding to the second table, said second file including data items and second labels included in the second table, said second labels being in one-to-one correspondence with each of the data items;

(G) input means, coupled to said input table memory means and to said input data memory means, for inputting a data items which are designated to have a one-to-one correspondence with one of the respective third labels included in the input table, and for storing the input data item and corresponding third labels in the input data memory;

(H) storing means, coupled to said input data memory means, to said first table memory means, and to said first file memory means, for reading, from the input data memory, data items which are in one-to-one correspondence with the respective third labels included in the first table, and for storing the read-out data items, in the first file, along with the first labels which coincide with the first labels corresponding to the third labels included in the first table; and (I) update means, coupled to said first file memory means, to said second table memory means, and to said second file memory means, for reading, from the first file, data items which are in one-to-one correspondence with the respective first label included in the second table, and for updating, in accordance with the read out data items data items which are in the second file and which respectively correspond to the second labels that coincide with the second labels respectively corresponding to the first labels included in the second table.

3. An apparatus for updating files, comprising:

(A) first table memory means for storing a first table including a plurality of first labels;

(B) second table memory means for storing a second table and a third table, said second table including a first transaction type code, a plurality of second labels, and one of the first labels, said one of the first labels corresponding to one of the second labels, and said third table including a second of the first labels, said another of the first labels corresponding to one of the third labels;

(C) first file memory means for storing a first file corresponding to said first table, said first file including data items and first labels contained in the first table and corresponding one-to-one with each of the data items;

(D) second file memory means for storing a second file corresponding to said second table, said second file including data items and second labels contained in the second table and corresponding one-to-one with each of the data items;

(E) third file memory means for storing a third file corresponding to said third table, said third file including data items and third labels contained in the third table and corresponding one-to-one with each of the data items;

(F) input means for inputting an arbitrary transaction type code;

(G) table selecting means, coupled to said second table memory means and to said input means, for selecting from the second table memory means one of the second and third tables including the transaction type code which coincides with the input transaction type code;

(H) first read out means, coupled to said first file memory means, to said table select means and to said second table means, for, when the selected table is the second table, reading a data item from the first file corresponding to the first label included in the second table;

(I) first update means, coupled to said first read out means, to said second table memory means, and to said second file memory means, for updating, in accordance with the read out data item, a data item which is in the second file and corresponds to the second label which coincides with the second label corresponding to the first label included in the second table;

(J) second read out means, coupled to said first file memory means and to said second table memory means, for, when the selected table is the third table, reading a data item from the first file corresponding to the first label included in the third table; and (K) second update means, coupled to said second read out means, to said second table memory means, and to said third file memory means, for updating, in accordance with the read out data item, a data item which is in the third file and corresponds to the third label which coincides with the third label corresponding to the first label included in the third table.

* * * * *